United States Patent
Goodall et al.

(10) Patent No.: US 8,329,786 B2
(45) Date of Patent: Dec. 11, 2012

(54) MODIFIED BINDER POLYMER FOR COATING COMPOSITIONS

(75) Inventors: Glenn William Goodall, Cambridgeshire (GB); Philip Louis Taylor, Buckinghamshire (GB)

(73) Assignee: Imperial Chemical Industries Limited, London (GB)

( * ) Notice: Subject to any disclaimer, the term of this patent is extended or adjusted under 35 U.S.C. 154(b) by 312 days.

(21) Appl. No.: 12/380,821

(22) Filed: Mar. 4, 2009

(65) Prior Publication Data

US 2009/0170979 A1    Jul. 2, 2009

Related U.S. Application Data

(62) Division of application No. 10/559,646, filed as application No. PCT/EP2004/005758 on May 26, 2004, now abandoned.

(30) Foreign Application Priority Data

Jun. 5, 2003 (GB) .................................. 0312916.0
Dec. 19, 2003 (GB) .................................. 0329415.4

(51) Int. Cl.
*A61K 8/73* (2006.01)
*C07H 1/06* (2006.01)
(52) U.S. Cl. ........................... 524/55; 524/47; 536/128
(58) Field of Classification Search .................... 524/47, 524/55; 536/128
See application file for complete search history.

(56) References Cited

U.S. PATENT DOCUMENTS

| 2,822,341 A | 2/1958 | Miller at al. |
| 3,891,580 A | 6/1975 | Morris et al. |
| 5,439,964 A | 8/1995 | Ohst et al. |
| 6,090,195 A | 7/2000 | Andersen et al. |
| 6,147,206 A | 11/2000 | Doner et al. |
| 2005/0148056 A1 | 7/2005 | Levine |

FOREIGN PATENT DOCUMENTS

| EP | 0 425 085 | 5/1991 |
| GB | 1 039 540 | 8/1966 |
| GB | 0 949 307 | 10/1999 |

OTHER PUBLICATIONS

International Search Report, International PCT Application No. PCT/EP2004/005758, mailed Aug. 24, 2004.
International Preliminary Report on Patentability, International PCT Application No. PCT/EP2004/005758, mailed Aug. 10, 2005.
K. B. Hicks, "Potential New Uses for Corn Fiber," *Proceedings of the Corn Utilization and Technology Conference*, Jun. 2 to 5, 2002: pp. 122-127.
Gilbert et al., "Perkin Transactions," *Journal of the Chemical Society* (vol. 2), 1998, pp. 1565-1572.
Scott Heitzman, "Colorants" (Abstract and Article), Mar. 15, 2002.
John D. Roberts et al., "Carbohydrates" *Basic Principles of Organic Chemistry*, Ch. 18., p. 636, Jun. 15, 1964.

*Primary Examiner* — Ling Choi
*Assistant Examiner* — Gennadiy Mesh
(74) *Attorney, Agent, or Firm* — Kenyon & Kenyon LLP

(57) ABSTRACT

A film-forming binder polymer for a coating composition such as a paint, varnish or woodstain where the polymer is modified by the presence of bonded moieties derived from plant gum, particularly plant fibre gum obtainable from plant fibre, especially corn fibre gum and more particularly moieties derived from proteo-xylans and/or furanose. The modified binder polymer minimises the need to use coalescing solvents without producing poor dried paint coatings which fail the scrub resistance tests also improves the opacity of the dried coating composition.

15 Claims, No Drawings

MODIFIED BINDER POLYMER FOR COATING COMPOSITIONS

CROSS REFERENCE TO RELATED APPLICATIONS

This application is a divisional application of U.S. application Ser. No. 10/559,646, filed Dec. 2, 2005 (now Abandoned), which is the National Phase of PCT/EP04/05758, filed on May 26, 2004, which claims priority to GB 0312916.0, filed Jun. 5, 2003, and GB 0329415.4 filed Dec. 19 2003.

BACKGROUND OF THE INVENTION

This invention relates to a modified film-forming binder polymer for a coating composition and to coating compositions containing the modified polymer. The modified polymer is especially useful in architectural coating compositions such as paints, varnishes or woodstains which can be applied by brush, roller or pad at ambient temperatures of say 0 to 30° C. to surfaces associated with buildings, furniture or fittings found in or around buildings. For brevity, all such architectural coating compositions will be referred to as "paints".

All aqueous architectural paints contain film-forming binder polymer. As a coating of liquid paint dries on a surface, this film-forming binder polymer serves to form a film (i.e. a dried coat) of paint which bonds to the surface and also binds together all the non-volatile components of the paint including particularly any opacifiers, pigments and extenders present.

A wide variety of conventional film-forming binder polymers are available, but those most commonly used in aqueous architectural paints are of three broad types obtained from mono-ethylenically unsaturated monomers and known colloquially as the "acrylics", the "vinyls" and the "styrenics". The "acrylics" are usually copolymers of at least two alkyl esters of one or more mono-ethylenically unsaturated carboxylic acids (e.g. methyl methacrylate-butyl acrylate copolymer) whilst the "vinyls" usually comprise copolymers of a mono-vinyl ester of a saturated carboxylic acid and at least one of either an acrylic monomer or a different mono-vinyl ester. The "styrenics" are copolymers containing styrene (or a similar mono-vinyl aromatic monomer) together with a copolymerisable monomer which is usually an acrylic.

Such film-forming binder polymers may be produced as solution copolymers or dispersion copolymers in a carrier liquid. Solution copolymers are substantially dissolved in the carrier liquid whereas dispersion copolymers are produced as discrete particles in the carrier liquid. The solventborne or aqueous dispersions of particles require stabilisers, sometime referred to as emulsifiers or surfactants, to prevent the particles from flocculating and forming a sediment, thereby improving the storage and shear stability of the dispersion. The carrier liquid may be organic solvent or an aqueous medium. Typically the carrier liquid used to make a solution copolymer is a liquid which is a good solvent for the copolymer concerned such that the copolymer is substantially dissolved in it. Where the carrier liquid is aqueous, at least 50% by weight of the liquid is water with the remainder being water compatible organic solvent or solvent mixture.

Such solution or dispersion copolymers useful as film forming binder polymers, whether solventborne or waterborne can be made by well-known solution polymerisation or emulsion polymerisation methods respectively.

Paints containing aqueous dispersions of particles of conventional film-forming binder polymers apply well to surfaces at warmer temperatures of say above 10° C. but if they are applied at low temperatures, the dried coats of paint formed are prone to cracking and consequently poor scrub resistance. Cracking occurs because the low temperatures impede the coalescence of the binder polymer particles into a film. Coalescence can be improved by adding organic so-called "coalescing solvents" to the paint formulation and typical of such organic solvents are ethylene glycol, propylene glycol, benzyl alcohol and the proprietary solvent called "Texanol" which is trimethylpentane diol isobutyrate. Nowadays such solvents are considered to be environmentally unfriendly and so an alternative solution to the cracking problem has been to use binder polymers having much lower glass transition temperatures (Tg) despite the known disadvantages of such low Tgs. The first disadvantage is a reduction in scrub-resistance. The second disadvantage is that the tackiness associated with newly applied dried coats of paint persists for longer. Glass transition temperature, Tg, is defined in European Patent Specification EP 0 425 085A, the contents of which are herein incorporated by reference.

Opaque paints often contain particulate pigments such as titanium dioxide in the form of rutile as an opacifying white pigment. The rutile particles are coated with other oxides to minimise any tendency for rutile to promote light induced degradation and so the rutile is expensive. Rutile also detracts from the scrub-resistance of a dried coat of paint if used in a high concentration in the paint formulation.

The amount of pigment in a dry paint film is an important feature as it can affect, for example, the final colour, opacity, hardness and scratch resistance of the dried paint. It is usually expressed as the volume of the pigment contained in the dry film compared with the total volume of the dried paint (including binder). This ratio is generally referred to as the Pigment Volume Concentration or PVC of the paint and expressed as a percentage. Other non-film forming particulate materials such as fillers and extenders, for example China Clay, may be included in the calculation to give the total PVC, expressed here as PVC (total) to distinguish it from PVC ($TiO_2$) which refers to the PVC resulting only from the titanium dioxide content of the paint.

Opacifying pigments such as titanium dioxide can be expensive as well as having detrimental effects on paint properties such as scrub resistance and durability. Any improvement in opacity of the paint can be exploited by reducing the cost of the paint or improving the opacity so that fewer coats of paints are required. This is particularly important in pastel shades and whites as such colours are usually of low opacity.

It is an object of this invention to provide a modified film-forming binder polymer for a coating composition which at least minimises and usually avoids the need for the coating composition to contain an organic coalescing solvent without inducing film cracking or creating poor scrub-resistance and persistent tackiness in a dried coat of paint. An alternative object is to improve the opacity of coating compositions. A further alternative object is to promote the opacifying and pigmenting efficiency of titanium dioxide, especially rutile so that less of it is needed in a formulation to achieve a given opacity. A still further object of the invention is to provide coating compositions containing the modified film-forming binder polymer.

Accordingly, this invention provides a film-forming binder polymer for a coating composition wherein the polymer is modified by the presence of bonded moieties, preferably proteo-xylans and/or furanose moieties, obtainable from plant gums.

Preferably, the amount of modification on a weight basis of modified binder is from 0.1% to 15%, more preferably from 1% to 10%.

The term bonded is intended to include not only the situation where the plant gum moieties and the film forming binder polymer are chemically combined by, for example covalent bonds, but also when they exist as an intimate mixture. Preferably the bonded moieties are chemically attached, more preferably by covalent bonds, to the binder polymer. Where the modified film forming binder polymer is a dispersion, it is preferred that the majority, preferably all of the particles are each substantially comprised of both the binder polymer and the plant gum moieties whether chemically combined or as a mixture. Even more preferably, the particles are of the core shell type.

It has been found that coating compositions containing the modified binder polymer require minimal and usually zero amounts of an organic coalescing solvent yet do not suffer from significant film cracking, poor scrub resistance or excessively persistent tackiness in a dried coat of the composition. Also, the opacity of coating compositions is improved.

Suitable plant gums include those that exude from plants, usually trees with damaged bark. A suitable such gum is gum arabic, produced by the acacia tree. Alternatively and additionally suitable plant gums are obtainable from plant fibre which form the fibrous parts of plants. Typically, the fibrous parts originate from the husk or seed case but any plant fibre material will do. Useful plant gums containing moieties suitable for modifying the binder polymer are obtainable from the fibrous material of various plants, including corn or maize, wheat, oats, barley, rice and sugar beet. Plant gum obtainable from sugar beet is also known as araban.

In order to obtain plant gums from plant fibres, the fibres must undergo chemical treatment. U.S. Pat. No. 6,147,206 published 14 Nov. 2000, the content of which is herein incorporated by reference, describes such a process for extracting gum from corn fibre, although the teaching contained therein can be used to extract plant gum from other plant fibre material too.

A summary of the process disclosed in U.S. Pat. No. 6,147,206 is as follows. Crude corn fibre is obtained as a by-product from the wet or dry milling of corn, a process used to extract starch. The crude corn fibre obtained from the milling process contains some 20% by weight of starch. This is removed by one of two methods: slurrying the fibre in water at approximately 7 wt % solids and heating to 90° C. followed by treatment with a thermally stable alpha amylase enzyme for at least 1 hour. A suitable amount of the enzyme is about 1 wt % on fibre solids. Following this, the fibre is filtered through a screen or a horizontal decanter to get rid of the solubilised starch and rinsed with fresh water to yield the destarched fibre. Alternatively, the fibre is slurried with water and cooked in a continous cooker where it is exposed to steam for a few seconds thereby solubilising the starch. The fibre is rinsed with fresh water and filtered using a series of screens or a horizontal decanter to yield the destarched fibre. The destarched fibre from either process, now containing 2% or less by weight of starch, is slurried in water again and the pH raised to 11.5 with sodium hydroxide or calcium hydroxide. Sodium hydroxide is preferred. The temperature is raised to 95° C. and an aqueous solution of hydrogen peroxide (33%) is added at about 10 wt % calculated on the solids of the destarched fibre. The temperature of the slurry is maintained at 95° C. for about an hour, after which time it is filtered at the high pH through a horizontal decanter to remove the corn fibre residue, now substantially devoid of corn fibre gum. The alkaline liquid contains the corn fibre gum. The pH of the alkaline liquid is reduced to 4.5 using hydrochloric acid whereupon a precipitate is formed which is filtered using a vacuum drum coated with diatomaceous earth. The precipitate is discarded and the resulting solution spray dried to yield a dry corn fibre gum useful for modifying film forming binder polymer.

Suitable plant gums include mixtures comprising polysaccharides, proteins and ash, an insoluble material. The relative amounts, by weight, of these materials vary from 65 to 85:0.5 to 35:0 to 15 respectively, varying according to the precise process used to obtain the plant gum. Preferably the amount of ash is below 5% and the protein from 2 to 15%, the remainder being polysaccharide.

The polysaccharides found in plant gums are composed of various monosaccharides, including glucose, galactose, mannose, xylose, arabinose (a 1:1 mixture of pyranose and furanose), rhammose and glucoronic acid. However, some of the protein is thought to be covalently bonded to the polysaccharides to form protein-polysaccharide adducts known as a proteo-xylan. Such proteo-xylans are effective surface-active agents which makes plant gums containing them particularly useful in providing aqueous dispersions of binder polymers. Preferably, at least some of the plant gum is proteo-xylan; more preferably substantially all of it is.

Corn fibre gum is a well known product described in the paper 'Potential New Uses for Corn Fiber' given by K B Hicks et al during the Proceedings of the Corn Utilization and Technology Conference, Kansas City, USA held on the 2 to 5 Jun. 2002 and published by the National Corn Growers Association and Corn Refiners Association, see pages 122 to 127. The content of these pages is herein incorporated by reference.

Typical corn fibre gum comprises approximately 80% by weight polysaccharide, 5% protein and 15% ash; the polysaccharide component consisting of galactose, xylose, arabinose and glucoronic acid.

Plant gum obtainable from corn fibre, gum arabic and/or sugar beet fibre has been found to be particularly useful in providing aqueous dispersions of modified polymer particles, especially where the particles comprise binder polymer. Such dispersions are very stable, resisting sedimentation, and produce very little fouling of the polymerisation reactor during manufacture. It is thought that this may be due to the presence of proteo-xylans in these gums.

Preferably, the binder is modified by the presence of bonded moieties obtainable, more preferably obtained from corn fibre gum. Preferably, the corn fibre gum is used at a level of from 0.1 wt % to 10 wt %, even more preferably from 1 wt % to 5 wt % and most preferably from 2 wt % to 4 wt %, based on the total binder polymer.

Galactose and glucoronic acid are present in a weight ratio of about 2:1. Pyranose and xylose have the structural formulae, differing only at the carbon 4 position where pyranose has the hydroxyl group above the ring whereas in xylose the hydroxyl group is below the ring. Note that the protons on the ring carbons have been omitted for simplicity.

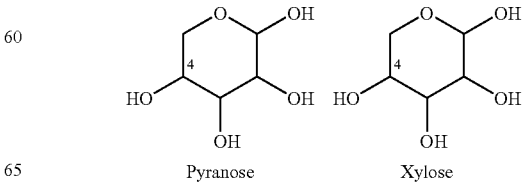

Pyranose          Xylose

Furanose has the structural formula shown below where there is a very labile hydrogen atom at carbon 4 which is thought to readily take part in chemical reactions including bonding to conventional monomers during polymerisation processes in which they form binder polymers. The liability of the hydrogen at position 4 is described in an article by Gilbert et al. on pages 1565 to 1572 of the Perkin Transactions (Volume 2) of the Journal of the Chemical Society of 1998, the contents of which pages are herein incorporated by reference. It is thought that the ability of furanose to take part in such reactions helps to graft the polysaccharide and or proteo-xylans to the binder polymer.

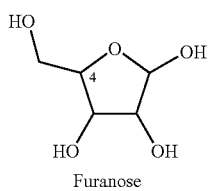

Furanose

Transactions (Volume 2) of the Journal of the Chemical Society of 1998, the contents of which pages are herein incorporated by reference. It is thought that the ability of furanose to take part in such reactions helps to graft the polysaccharide and or proteo-xylans to the binder polymer.

The examples of suitable mono-ethylenically unsaturated monomers used to make conventional (that is unmodified) polymers are also suitable for making the binder polymers modified with corn fibre gum. Such monomers include:

a) "acrylics" such as alkyl (especially methyl, ethyl, ethylhexyl and n-butyl) esters of unsaturated carboxylic acids such as acrylic or methacrylic or fumaric acids or maleic anhydride, b) "vinyls" such as mono-vinyl esters (especially vinyl acetate or vinyl "Versatate"[1]) and c) "styrenics" which are usually styrene but which can be other monovinylidene aromatics such as vinyl toluene or vinyl pryidine and which are usually copolymerised with comonomers such as the ethyl or ethylhexyl or butyl acrylics mentioned above.

[1] Vinyl "Versatate" is the vinyl ester of so-called "Versatic" acid which is a mixture of aliphatic monocarboxylic acids each containing an average of 9, 10 or 11 carbon atoms and is commercially available from the Shell Chemical Company of Carrington, England.

Various mono-ethylenically unsaturated acid or acid anhydride monomers may be copolymerised with the binder monomers to increase the hydrophilic character of the binder polymer in alkaline solutions. This is especially advantageous as it serves to increase the stability of the aqueous dispersions. However the acid comonomers usually do not exceed 7 mol % of the total monomers for otherwise the binder polymer becomes too hydrophilic to retain acceptable scrub-resistance.

Suitable acids include unsaturated carboxylic acids and in particular acrylic or methacrylic acids and unsaturated acid anhydrides include maleic anhydride. Acids or their anhydrides may allow some bonding of the binder polymer by ester formation to other hydroxylic moieties in the corn fibre gum in addition to the bonding to furanose by means of labile hydrogen.

It is desirable to choose combinations of monomers which include a sterically bulky monomer so as to result in binder polymers in which the chain moieties have a Tg of below 77° C. and preferably below 52° C. Even more preferably the Tg is from −20° C. to 27° C. and most preferably from −10° C. to 10° C. Preferred "acrylic" binder copolymers include copolymers of methyl methacrylate with butyl acrylate or 2-ethylhexyl acrylate as sterically bulky monomers and optionally copolymerised with up to 7 mol % acrylic or methacrylic acid. Preferred "vinyl" binder copolymers include copolymers of vinyl acetate with a bulky monomer which is usually vinyl "Versatate" or bulky acrylic monomer as above plus the same optional acid comonomers. Preferred "styrenic" binder copolymers include copolymers of styrene with butyl acrylate or 2-ethylhexyl acrylate serving as the bulky monomers with optionally up to 7 mol % acid comonomers as above. Tg will be increased unacceptably by excessive crosslinking and so it is essential not to incorporate more than 7 wt % of a conjugated diene into the binder polymer and it is very much preferred to avoid any such diene.

Preferably the film forming binder polymer is carried in aqueous medium. This reduces the organic solvent lost to the atmosphere when a paint based on such a binder is used thereby minimising unpleasant odours, especially when painting in an enclosed space. More preferably it is an aqueous dispersion of polymer particles and most preferably it is made by an emulsion polymerisation process.

If copolymerisation at superatmospheric pressures is commercially tolerable, the hydrophilic nature of the binder polymer can be adjusted downwards by including some mono-olefin (usually some ethylene) in the monomers. This will improve scrub-resistance.

The simplest way to produce a modified binder polymer is to add plant gum to the polymerisation reaction mixture from which the binder polymer is formed. Preferably the plant gum is obtainable from plant fibre, more preferably from corn fibre and most preferably the plant gum contains proteo-xylan and/or furanose moieties.

A process is also provided for modifying film forming binder polymers which are binder polymers for coating compositions wherein plant gum of the type described above, preferably corn fibre gum, is added to the polymerisation reaction which produces the binder polymer. Such polymerisations are conventionally performed with the aid of free radical or redox initiators. The temperature at which the polymerisation is carried out depends on the boiling point of the carrier liquid used and the radical flux of the initiator selected. Where the modified binder polymer is made as a dispersion of polymer particles in water, the temperature is preferably from 20 to 98° C., more preferably from 30 to 95° C. and most preferably from 50 to 90° C.

Without wishing to be bound by this, it is suspected that during the polymerisation the constituents of the plant gum such as corn fibre gum are chemically incorporated into the copolymer, for example by abstraction of labile hydrogen from the furanose by the initiators. Preferably from 0.1 to 5 wt % (and more preferably 2 to 4 wt %) of plant gum, more preferably corn fibre gum is added to the polymerisation reaction mixture where the percentages are based on the total weight of the monomers from which the binder polymer is to be formed.

A coating composition is also provided wherein the composition contains modified binder polymer as herein described. Preferably the coating composition further contains components usually found in paints such as pigments, fillers, extenders, rheological modifiers, dispersants, antifoams, flow aids, crosslinkers and biocides. Preferably the coating composition contains pigment and more preferably the pigment is titanium dioxide. Even more preferably the pigment is rutile titanium dioxide. Preferably the PVC (TiO$_2$) is from 5 to 35%, more preferably from 10 to 35%, even more preferably from 12 to 30% and most preferably from 17 to 30%. The PVC (total) is preferably from 8 to 75% depending on the gloss or sheen level of the paint.

An aqueous dispersion of the modified film-forming binder copolymer is easily converted into a coating composition by mixing it with all the components of the composition except for, preferably any chelate structuring agent. If a strongly structured composition, the chelate is preferably stirred in just before the composition is filled into cans so that the gel structure develops in the can.

The most significant of the other components are opacifying pigments such as rutile or anatase titanium dioxide or voided organic polymer particles. Typical fillers and extenders include chalk, limestone, kaolin and talc. Silica may also be present as a matting agent. Whilst this invention is of most importance in making paints, it is also possible to omit the opacifier to produce a varnish or woodstain.

The coating compositions preferably have a "Rotothinner" (low shear) viscosity of from 0.15 to 3.0 pascal.sec all measured at 25° C. using a 5.6 cm diameter spindle rotating at 560 rpm. A strongly structured thixotropic composition preferably has a gel strength at 1 week of at least 50 g.cm.

The coating composition is preferably solventborne or waterborne. Waterborne compositions are preferred whereby at least 50% by weight of the carrier liquid in the composition is water. Such compositions release less organic solvents into the atmosphere and are also preferred by users as the also have reduced odour.

The use of the modified binder polymer in a coating composition improves the opacity of the coating composition. It is not known by which mechanism this occurs, although and without wishing to be bound by this, it is thought that the opacifying efficiency of pigments such as titanium dioxide, especially rutile is increased by from 10 to 20%. This allows a greater opacity to be achieved or alternatively reduced concentrations of rutile with a consequent improvement in scrub-resistance and cost.

Accordingly, the invention also provides a method for improving the opacity of coating compositions by employing a modified binder polymer as a binder polymer in a coating composition. Preferably the coating composition contains particulate non-film forming material and more preferably it is titanium dioxide, especially in the form of rutile.

The invention will now be illustrated by the following Examples of which Examples A to E are comparative.

The paints were tested for opacity and scrub-resistance as follows:

Contrast Ratio

The opacity was measured using the contrast ratio method according to the following procedure. The paint is spread over a Morest chart Number 9 using a K-bar 6 to give a wet paint film of approximately 60 μm. The paint is allowed to dry over a period of from 2 to 3 hours at a temperature of about 20° C. One half of the Morest chart is coloured black and the other white. A Spectroflash 600 PLUS spectrophotometer is used to measure the reflected light from the dried paint applied over first the black and then the white half of the Morest chart. The amount of measured light reflected on the black half is divided by the amount reflected from the white side and expressed as a percentage contrast ratio. The measurements are repeated three times and averaged.

Scrub Resistance Test:

The wet scrub resistance was assessed as follows: a solid paint coating was prepared using a 400 micron block spreader, allowing it to dry and aging it in an oven at 40° C. for 7 days. The aged paint was tested according to British Standard 7719 of 1994 and a weight loss reported. A weight loss of less than 2 mg of paint per cm$^2$ is acceptable (pass).

The ingredients used in the foregoing examples are listed below and are available from the suppliers or the process indicated.

| | |
|---|---|
| Acrysol SCT-275 | A non-ionic associative thickener available from Rohm and Haas (UK) Ltd. |
| Aquaflow NHS 300 | A polyether thickener available from Hercules. |
| "Bentone" Ew: | Bentonite clay supplied by Rheox Ltd of UK |
| China Clay Supreme | China Clay extender available from ECC International, UK |
| Corn Fibre Gum | A plant gum obtained by the process disclosed in U.S. Pat. No. 6,147,206 a summary of which is provided in the description of this specification. The composition, by weight %, of the Corn Fibre Gum obtained by this process is 80% polysaccharide, 5% protein and 15% ash. The polysaccharide component comprised the following components in the proportions indicated; 48.0% xylose, 39.4% arabinose, 8.4% galactose and 4.2% glucoronic acid. |
| Gum Arabic | A plant gum obtained from Sigma-Aldrich of Dorset, England. The composition, by weight %, comprising 97.9% polysaccharide and 2.1% protein. The polysaccharide component comprised the following components in the proportions indicated; 45.4% galactose, 24.7% arabinose, 13.4% rhammose and 16.5% glucoronic acid. |
| Araban | A plant gum obtained from British Sugar. The composition, by weight %, comprising 97.1% polysaccharide and 2.9% protein. The polysaccharide component comprised the following components in the proportions indicated; 42.0% glucose, 8.4% galactose, 10.1% xylose, 35.3% arabinose and 4.2% rhammose. |
| "Dispelair" CF 246: | A surfactant supplied by Blackburn Chemicals Ltd of Blackburn, UK |
| "Disponil" A1580: | A surfactant supplied by Henkel Performance Chemicals of Germany |
| "Blanose" 7L2C: | A cellulosic thickener supplied by Hercules Inc of USA |
| "Britomya" V: | A calcium carbonate supplied by OMYA UK Ltd of Surrey, UK |
| "Dispex" N40: | A surfactant supplied by Allied Colloids of UK |
| "Empimin" OT75: | A surfactant supplied by Albright & Wilson of UK |
| "Fordacal" 30: | A calcium carbonate extender supplied by Foramin Co. Ltd of UK. |
| "Lubrizol" 2405: | A surfactant supplied by Lubrizol UK LTD of UK |
| "Mergal" 711 K6: | A biocide supplied by Troy Chemicals Europe BV of the Netherlands. |
| "Microdol" H 200: | Dolomite supplied by Omya of Cologne, Germany. |
| "Natrosol" 250MR: | A cellulosic thickener supplied by Hercules Inc of USA |
| "Perlankrol" ESD60: | A surfactant supplied by Akzo Nobel Chemicals Ltd of the Netherlands |
| "Rocima" V189: | A biocide available from Thor Plastics UK, New Road, Newhaven, UK |
| "Rhodacal" A246L: | A surfactant supplied by Rhodia SA of France |
| "Ropaque" ULTRA: | A voided organic particulate opacifier supplied by Rohm & Haas of USA |
| Tioxide TR92 | Titanium dioxide supplied by Huntsman Chemicals |
| "Tilcom" AT35: | A chelate structuring agent supplied by Tioxide Specialists Ltd (Huntsman) of Teeside, UK |

EXAMPLE 1

Production of a Modified Acrylic Binder Polymer

An aqueous dispersion of a binder polymer modified with corn fibre gum was made using the ingredients shown below and according to the procedure described.

| Plant Gum Charge | Weight g |
|---|---|
| Water | 578.35 |
| Corn Fibre gum | 13.86 |
| Sodium bicarbonate | 1.32 |
| Sodium Chloride (pure and vacuum dried) | 1.12 |
| Rhodacal A246 L | 1.58 |
| | 592.63 |

| Seed Monomer Charge | Weight g |
|---|---|
| Vinyl acetate | 22.85 |
| Vinyl "Versatate" | 4.04 |
| "Empimin" OT 75 | 0.28 |
| | 27.17 |

| Seed Initiator Charge | Weight g |
|---|---|
| Ammonium persulphate | 0.78 |
| Water | 17.07 |
| Lubrizol 2405 | 0.54 |
| | 18.39 |

| Acrylic Monomer Charge | Weight g |
|---|---|
| Methyl methacylate | 252.01 |
| "Disponil" A 1580 | 20.74 |
| "Perlankrol" ESD60 | 3.15 |
| 2-Ethyl hexyl acrylic | 241.58 |
| | 517.48 |

| Main Initiator Charge | Weight |
|---|---|
| Ammonium persulphate | 0.76 |
| Water | 16.76 |
| | 17.52 |

| Mop-up initiator charge | Weight g |
|---|---|
| Ammonium persulphate | 0.18 |
| Water | 3.90 |
| | 4.08 |

| Biocide Solution | Weight g |
|---|---|
| Rocima V189 | 1.65 |
| Water | 4.40 |
| | 6.05 |

The plant gum charge was added to a round-bottomed flask fitted with a stirrer and a nitrogen purge. The charge was purged by bubbling nitrogen through it for 5 minutes. The temperature was increased to 75° C. and held for 30 minutes. The seed monomer charge was then added to the flask and maintained at 75° C. for a further 10 minutes. The seed initiator charge was then added and the temperature increased to 90° C. over 30 minutes during which time an aqueous dispersion of seed copolymer formed, possibly with some bonding of moieties from the plant gum.

The acrylic monomer charge together with the main initiator charge were added dropwise over a period of two hours to the seed copolymer whilst the temperature was maintained at 90° C. During this time, an aqueous dispersion of seeded copolymer of methyl methacrylate and 2-ethyl hexyl acrylate formed with bonding of moieties from the plant gum. On completion of the addition of the acrylic monomers, the mop-up initiator charge was added and the temperature maintained at 90° C. for a further 30 minutes after which the dispersion was allowed to cool to 37° C. The biocide solution was then added.

The dispersion comprised a copolymer of methyl methacrylate/2-ethyl hexyl acrylate/vinyl acetate/vinyl versatate having a solids content of 46.0 wt %.

EXAMPLE A COMPARATIVE UNMODIFIED BINDER POLYMER

An aqueous dispersion of an unmodified binder polymer was made using the ingredients listed below according to the following process.

| Aqueous charge | Weight g |
|---|---|
| Water | 499.93 |
| Blanose 7L2C | 3.32 |
| Disponil A1580 | 2.58 |
| Sodium bicarbonate | 1.01 |
| Sodium Chloride (pure and vacuum dried) | 1.22 |
| | 517.13 |

The components of the aqueous charge were added to a round bottom reactor whilst stirring. The temperature of the contents was raised to 75° C. During this heating period a monomer feed mixture was prepared in a separate vessel.

| Monomer feed mixture | Weight g |
|---|---|
| Methyl methacrylate | 302.74 |
| Acrylic acid (glacial) | 6.00 |
| Disponil A1580 | 23.81 |
| Perlankrol ESD60 | 3.61 |
| 2-ethyl hexyl acrylate | 290.76 |
| | 626.92 |

An amount of 31.35 g of this mixture was removed from the vessel and added to the reactor. The temperature of the reactor contents was held at 75° C. for a further 10 minutes during which time an initiator solution consisting of 1.87 g of ammonium persulphate in 41.16 g of water was made. 9.73 g of the initiator solution were removed and added to the reactor. After 10 minutes the seed polymer formed and the temperature was raised over 30 minutes to 90° C. The remaining monomer feed mixture of 595.57 g was added to the reactor over two hours during which time 28.01 g of the initiator solution were also added. At the end of this period the remaining initiator solution of 5.29 g was added to the reactor and held at 90° C. for a further hour to ensure complete polymerisation of the monomers. A reactor rinse of 15.38 g of water was added followed by 6.64 g of biocide solution consisting of 1.80 g of Rocima V189 in 4.80 g of water. The solids content was 52.5 wt %.

EXAMPLE 2, COMPARATIVE EXAMPLE B AND EXAMPLE 3

Preparation and Testing of Acrylic Matt Paints

EXAMPLE 2

A mill base was prepared as follows. An initial charge of 187.8 g of water was added to a 1 liter disperser container followed by 20.2 g of Orotan 731 and 1.5 g Dispelair CF246. The mixture was stirred for 5-6 minutes at about 1000 rpm using a high speed disperser fitted with a 7 cm Cowles blade. 121.2 g of Microdol H200, 101.3 g of China Clay Supreme and 131.4 g of Tioxide TR92 were weighed into a separate container and then added to the 1 liter container. A further 131.4 g of Tioxide TR92 was added to the disperser container. The disperser speed was gradually increased to 200 rpm and maintained at this speed for a further 5 to 10 minutes during which the pigment and extender started to disperse. A further 70.8 g of water was added followed by 1.5 g of Natrosol Plus Grade, the latter added carefully to the top of the vortex formed in the millbase through stirring. As dispersion proceeded the viscosity of the millbase rose and the speed of the disperser was raised to approximately 300 rpm in order to maintain good circulation of the millbase as evidenced by a vortex extending to about halfway into the mixture following the addition of the Natrosol Plus Grade the millbase was dispersed for a total of 25 minutes after which 0.2 g of Rocima V189 was added.

Paint Make-Up

To 729.0 g of the millbase was added 3.8 g of water and stirred at about 600 rpm using a paddle stirrer. Whilst stirring the diluted millbase, 220.9 g of the aqueous dispersion of modified binder polymer made according to Example 1 was also added followed by 0.4 g of ammonia solution finally the stirrer speed was raised to 900 rpm and the thickeners were added, comprising 11.5 g of Acrysol SCT-275 and 4.8 g of Aquaflow NHS300. The resulting paint was stirred for approximately 5 to 10 minutes following the thickener addition and allowed to stand for 16 hours at room temperature.

The liquid paint composition was substantially free of coalescing solvents.

The PVC (total) was 58.2% and the PVC (TiO$_2$) was 25.8%. The contrast ratio was measured at 98.1%.

The dried solid paint was tested for scrub resistance according to British Standard 7719 of 1994 and lost 0.77 mg of paint per cm$^2$ (pass).

COMPARATIVE EXAMPLE B

A millbase was made according to Example 2 except that 28.3 g of the initial charge of water were replaced by a solvent mixture consisting of 8.1 g of benzyl alcohol and 20.2 of Texanol.

To 729.0 g of millbase was added 10.9 g of water and stirred at about 600 rpm using a paddle stirrer. 192.7 g of the aqueous dispersion made according to Comparative Resin Example A was added whilst stirring. The remaining additions and conditions were identical to those of Example 2.

The liquid paint composition contained 3% by weight of coalescing solvents. The PVC (total) was 58.2% and the PVC (TiO$_2$) was 25.8%. The contrast ratio was 94.1%.

The dried solid paint was tested for scrub resistance according to British Standard 7719 of 1994 and lost 0.76 mg of paint per cm$^2$ (pass).

EXAMPLE 3

A paint was made using the ingredients and according to the method of Example 2 except that the amount of Tioxide TR92 pigment was reduced to achieve a PVC (total) of 55.2% and a PVC (TiO$_2$) of 20.9%. The contrast ratio was measured to be 94.5%. This is comparable to the contrast ratio of Comparative Example B that used significantly higher PVC (TiO$_2$) at 25.8% demonstrating more efficient utilisation of the titanium dioxide pigment.

The dried solid paint was tested for scrub resistance according to British Standard 7719 of 1994 and lost 0.74 mg of paint per cm$^2$ (pass).

EXAMPLE 4

An aqueous dispersion of a binder polymer modified with corn fibre gum was made using the ingredients shown below and according to the procedure of Example 1. This binder polymer differs from Example 1 in that the seed is based on acrylic monomers.

| Plant Gum Charge | Weight g |
|---|---|
| Water | 522.03 |
| Corn Fibre gum | 12.13 |
| Sodium bicarbonate | 1.23 |
| Sodium Chloride (pure and vacuum dried) | 1.05 |
| Rhodacal A246 L | 1.07 |
| | 537.51 |

| Seed Monomer Charge | Weight g |
|---|---|
| Methyl methacrylate | 12.91 |
| 2-ethyl hexyl acrylate | 12.37 |
| | 25.28 |

| Seed Initiator Charge | Weight g |
|---|---|
| Ammonium persulphate | 0.73 |
| Water | 15.90 |
| | 16.63 |

| Acrylic Monomer Charge | Weight g |
|---|---|
| Acetic acid | 4.30 |
| Methyl methacylate | 234.61 |
| "Disponil" A 1580 | 19.31 |
| "Perlankrol" ESD60 | 2.93 |
| 2-Ethyl hexyl acrylic | 224.89 |
| | 486.04 |

| Main Initiator Charge | Weight g |
|---|---|
| Ammonium persulphate | 0.71 |
| Water | 15.59 |
| | 16.30 |

| Mop-up initiator charge | Weight g |
|---|---|
| Ammonium Persulphate | 0.16 |
| Water | 16.76 |
| | 16.92 |

| Biocide Solution | Weight g |
|---|---|
| Rocima V189 | 1.54 |
| Water | 4.09 |
| | 5.63 |

The solids content of the aqueous dispersion was 45.6 wt %.

EXAMPLE 5

A paint was made was made using the ingredients and process of Example 2 other than the modified binder polymer of Example 4 replaced that of Example 1, on a solids weight for weight basis, and PVC (Total) and PVC (TiO$_2$) of Example 5 are slightly higher than Example 2, as indicated below.

The liquid paint composition was substantially free of coalescing solvents.

The PVC (total) was 60.5% and the PVC (TiO$_2$) was 27.4%. The contrast ratio was 95.9%.

The dried solid paint was tested for scrub resistance according to British Standard 7719 of 1994 and lost 1.72 mg of paint per cm$^2$ (pass)

COMPARATIVE EXAMPLE C

A paint was made was made using Comparative Unmodified Resin Example A. All other ingredients and amounts were the same as for Example B other than the PVC (Total) and PVC (TiO$_2$) of Example C are slightly higher than Example B, as indicated below.

The liquid paint composition contained 3% of coalescing solvents.

The PVC (total) was 60.2% and the PVC (TiO$_2$) was 27.2%. The contrast ratio was 91.7%.

The dried solid paint was tested for scrub resistance according to British Standard 7719 of 1994 and lost 0.72 mg of paint per cm$^2$ (pass)

EXAMPLE 6

An aqueous dispersion of a binder polymer modified with gum arabic was made using the ingredients shown below and according to the procedure described in Example 1.

| Plant Gum Charge | Weight g |
|---|---|
| Water | 669.35 |
| Gum Arabic | 12.13 |
| Sodium bicarbonate | 1.23 |
| Sodium Chloride (pure and vacuum dried) | 1.05 |
| Rhodacal A246 L | 1.07 |
| | 683.60 |

| Seed Monomer Charge | Weight g |
|---|---|
| Vinyl acetate | 25.03 |
| Empimin OT 75 | 0.25 |
| | 25.28 |

| Seed Initiator Charge | Weight g |
|---|---|
| Ammonium persulphate | 0.73 |
| Water | 15.90 |
| | 16.63 |

| Acrylic Monomer Charge | Weight g |
|---|---|
| Methyl methacylate | 234.61 |
| "Disponil" A 1580 | 19.31 |
| "Perlankrol" ESD60 | 2.93 |
| 2-Ethyl hexyl acrylic | 224.89 |
| | 481.74 |

| Main Initiator Charge | Weight |
|---|---|
| Ammonium persulphate | 0.87 |
| Water | 19.23 |
| | 20.10 |

| Reactor rinse (replaces Mop-up intiator charge) | Weight g |
|---|---|
| Water | 13.12 |

| Biocide Solution | Weight g |
|---|---|
| Rocima V189 | 1.54 |
| Water | 4.09 |
| | 5.63 |

The solids content of the aqueous dispersion was 42.9 wt %.

EXAMPLE 7

A paint was made using the ingredients and process of Example 2 other than the modified binder polymer of Example 6 replaced that of Example 1, on a solids weight for weight basis, and the PVC (Total) and PVC (TiO$_2$) of Example 7 are slightly higher than Example 2, as indicated below.

The liquid paint composition was substantially free of coalescing solvents.

The PVC (total) was 59.6% and the PVC (TiO$_2$) was 26.4%. The contrast ratio was 96.3%.

The dried solid paint was tested for scrub resistance according to British Standard 7719 of 1994 and lost 1.78 mg/cm$^2$ (pass)

EXAMPLE 8

An aqueous dispersion of a binder polymer modified with Araban was made using the same procedure and ingredients as in Example 6 except that the Plant Gum Charge contained 605.55 g of water, 24.24 g of Araban, 1.07 g of Rhodocol A246L and 1.05 g Pure vac dried sodium chloride. The solids content of the dispersion was 44.2 wt %.

EXAMPLE 9

A paint was made using the ingredients and process of Example 2 other than the modified binder polymer of Example 8 replaced that of Example 1, on a solids weight for weight basis.

The liquid paint composition contained 0.8% coalescing solvents.

The PVC (total) was 59.0% and the PVC (TiO$_2$) was 26.7%. The contrast ratio was 95.8%. The dried solid paint was tested for scrub resistance according to British Standard 7719 of 1994 and lost 1.38 mg of paint per cm$^2$ (pass)

What is claimed is:

1. An architectural coating composition comprising a modified film-forming binder polymer wherein the binder polymer is selected from the group consisting of acrylic polymers of alkyl esters of unsaturated carboxylic acids, vinyl polymers of mono-vinyl esters, and styrenics, that has been modified by the presence of a mixture obtained from plant fiber, which mixture includes a protein in an amount from 2 to 15 wt % and a polysaccharide and contains starch in an amount of less than 2 wt %, wherein the mixture is bonded to or is in intimate mixture with the binder polymer.

2. The architectural coating composition of claim 1 wherein the protein and polysaccharide of the mixture are covalently bonded to the binder polymer.

3. The architectural coating composition of claim 1 wherein the mixture comprises an adduct of protein bonded to polysaccharide.

4. The architectural coating composition of claim 3 where the adduct is a proteo-xylan.

5. The architectural coating composition of claim 1 wherein the mixture of protein and polysaccharide has been obtained by the steps comprising: a) wet or dry milling corn fibre to extract starch, b) slurrying the fibre in water at approximately 7 wt % solids and heating to about 90° C., and either c) treating the fibre with about 1 wt % calculated on the fibre solids, of a thermally stable alpha amylase enzyme for at least one hour, and d) filtering the fibre through a screen or a horizontal decanter to get rid of the solubilised starch and rinsing with water to yield the destarched fibre, or e) slurrying the fibre in water and cooking in a continuous cooker where it is exposed to steam for a few seconds thereby solubilising the starch, and f) rinsing the fibre with water and filtering using a series of screens or a horizontal decanter to yield the destarched fibre, and then g) slurrying the destarched fibre in water and raising the pH to 11.5 with sodium hydroxide or calcium hydroxide, h) raising the temperature to 95° C. and adding an aqueous solution of hydrogen peroxide (33%) at about 10 wt % calculated on the solids of the destarched fibre, i) maintaining the temperature of the slurry at 95° C. for about an hour and filtering to remove the corn fibre residue, j) reducing the pH to about 4.5 to form a precipitate, and k) filtering this to recover a solution comprising protein and polysaccharide.

6. The architectural coating composition of claim 1 wherein the mixture of protein and polysaccharide is obtained by extraction from a fibre selected from at least one of the plants in the group consisting essentially of maize (corn), wheat, oats, barley, rice, sugar and beet.

7. The architectural coating composition of claim 1 wherein the binder polymer and the protein and polysaccharide mixture form particles having a core shell structure.

8. The architectural coating composition of claim 1 wherein the composition further includes rutile titanium dioxide.

9. The architectural coating composition of claim 1, wherein the amount of modification on a weight basis of modified film-forming binding polymer is from 0.1% to 15%.

10. The architectural coating composition of claim 9, wherein the amount of modification on a weight basis of modified film-forming binder is from 1% to 10%.

11. The architectural coating composition of claim 1, wherein the coating composition has a viscosity of 0.15 to 3.0 Pa.s when measured at 25° C. using a 5.6 cm diameter spindle rotary at 560 rpm.

12. The architectural coating composition of claim 1, wherein the amount of the mixture is from 0.1 wt % to 10 wt % based on the total amount of binder polymer.

13. The architectural coating composition of claim 1, wherein the modified film-forming binder polymer is obtained by adding the mixture to a polymerization reaction mixture of monomers from which the binder polymer is formed.

14. The architectural coating composition of claim 13, wherein the amount of mixture added is from 0.1 to 5 wt %.

15. The architectural coating composition of claim 13, wherein the polymerization reaction mixture comprises one or more mono-ethylenically unsaturated monomers selected from alkyl esters of unsaturated carboxylic acids, mono-vinyl esters, and styrenes.

* * * * *